March 30, 1937.  L. C. BROECKER  2,075,167
PNEUMATIC VALVE INSIDE CONSTRUCTION
Original Filed July 1, 1931
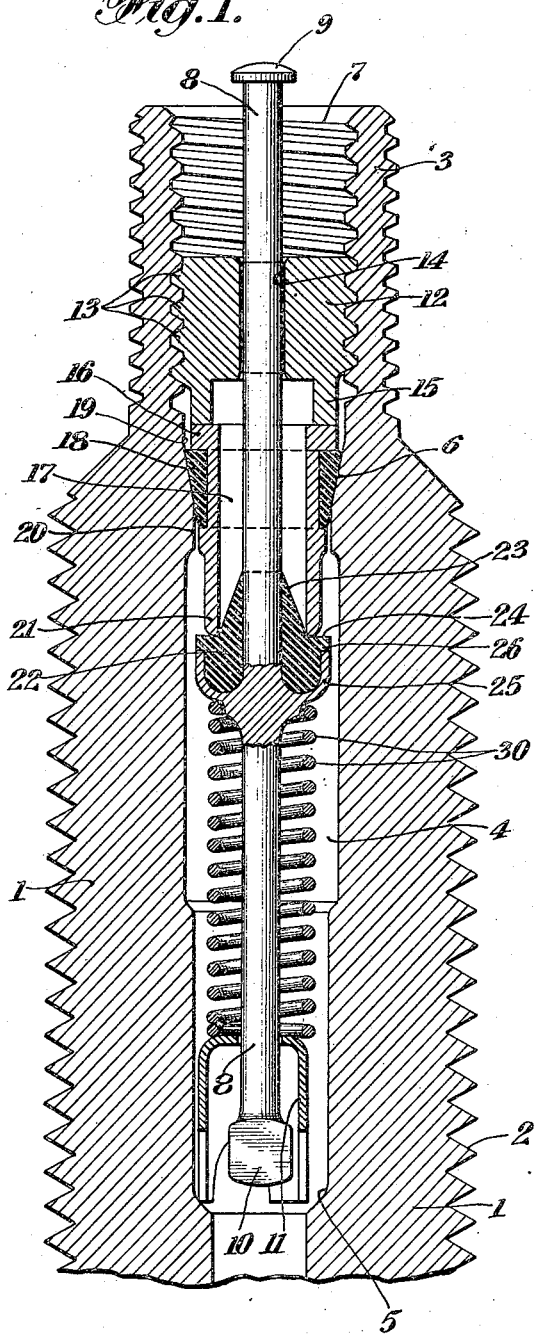
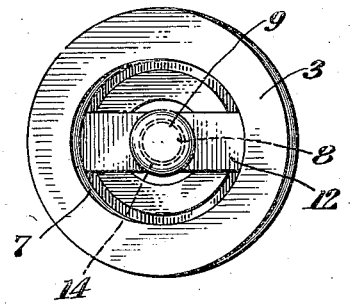
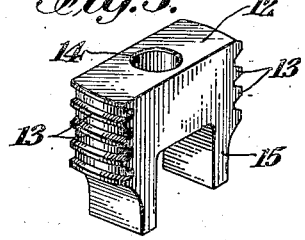
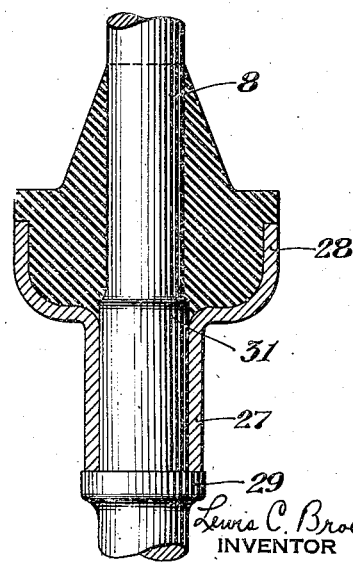
Lewis C. Broecker
INVENTOR
BY Prindle Bean & Mann
ATTORNEYS Patented Mar. 30, 1937

2,075,167

UNITED STATES PATENT OFFICE 2,075,167

PNEUMATIC VALVE INSIDE CONSTRUCTION

Lewis C. Broecker, Bridgeport, Conn., assignor to Bridgeport Brass Company, Bridgeport, Conn., a corporation of Connecticut Application July 1, 1931, Serial No. 548,063
Renewed May 14, 1935

8 Claims. (Cl. 152—12)

This invention relates to improvements in pneumatic valve constructions and more particularly to what are called "valve insides".

Among the objects of this invention are the provision of such a valve having the highest possible inflation speed, efficiency in operation and in the prevention of leakage, and simplicity in manufacturing and assembling.

To the accomplishment of the foregoing and such other objects as may hereinafter appear, this invention consists in the construction, combination and arrangement of parts hereinafter described and then sought to be defined in the appended claims, reference being had to the accompanying drawing forming a part hereof and which shows, merely for the purpose of illustrative disclosure, a preferred embodiment of my invention, it being expressly understood, however, that various changes may be made in practice within the scope of the claims without digressing from my inventive idea.

In the drawing—

Figure 1 represents a vertical longitudinal cross section through a valve equipped with valve insides embodying my invention.

Figure 2 is a top plan view of the construction shown in Figure 1.

Figure 3 is a perspective view of the screw plug.

Figure 4 is a vertical longitudinal section showing a modified form of cup construction for holding the valve seat.

Referring now to the drawing, the numeral 1 designates the valve stem which is preferably exteriorly screw threaded as at 2, to receive a dust or other cap, not shown, and which has the reduced externally threaded head or end 3 to receive the sealing or other cap (not shown). This valve stem is provided with the longitudinal bore or passage 4 which extends entirely therethrough so as to communicate with the interior of the tube or other pneumatic article. The interior of the stem is provided with the inwardly extending annular flange or shoulder 5 and the intermediate bevelled or tapered seat 6 for the barrel to be presently described, and also the internally screw threaded portion 7 in its upper end or head 3 which provides means for receiving and holding the valve inside construction as a whole. This will now be described.

The valve insides includes the elongated center pin 8 having the head 9 on its upper end and having its lower end or foot 10 slidably positioned within the shoe or hood member 11 which is supported by or upon the annular flange or shoulder 5 within the stem 1. The upper portion of the center pin 8 is supported, centered and guided by means of the screw plug element 12 shown in detail in Figure 3 of the drawing. This plug element is in the form of a segmental member having screw threads 13 on each externally cylindrical end thereof adapted to fit the internal screw thread 7 on the inside of the upper end of the valve stem. The screw plug is provided with the bore or passage 14 which is slightly greater in diameter than the diameter of the shank of the center pin which passes therethrough. The plug 12 also has the downwardly extending projections or legs 15 which act as bearing members to engage the upper end 16 of the barrel member 17. This barrel member is preferably in the form of an elongated sleeve and has a tapered gasket or washer 18 secured around the outside thereof and between the spaced shoulders 19 and 20. This gasket or washer 18 is of such size as to tightly fit against the tapered or bevelled seat 6 formed on the inside of the valve stem, when the barrel member is forced downwardly to its proper position by means of the screw plug 12. The lower end 21 of the barrel member 17 forms the seat for the valve proper. It is preferably in the form of an annular seat with a fairly narrow rounded edge as shown. It is adapted to be engaged by the washer or gasket element 22 which may be formed of rubber, composition or other suitable material. This washer or gasket element is preferably formed with a tapered or conical projection 23 extending upwardly from a flat shoulder or area 24 and the relative sizes of the conical portion 23 and the barrel member 17 are so arranged that the parts are centered and properly seated with respect to each other.

This washer or gasket element 22 is preferably molded to the center pin 8, and in the form shown in Figure 1, this is accomplished by providing a cup element 25 on the center pin 8. This cup is formed as an integral part of the center pin itself and by successive operations in suitable dies from the material thereof. The washer or gasket 22 is molded therein and sufficient material is used and the molding operation accomplished so that the washer or gasket extends entirely over the top edge of the cup element 25 as at 26. This provides a large or extended surface to receive the lower or seat end of the barrel and thus prevents any possibility of leakage between these parts when seated. It will be noted that the circular valve-seat portion 21 of the barrel is well spaced all around from the inside wall of the valve stem. Similarly the cup 25 is well spaced from the inside of the valve stem; and by extending the washer or gasket 22 over the edge of the cup, an ample annular portion 24 is provided for engaging the valve-seat and yet the outside diameter of the valve is maintained small so as to interpose minimum interference to the free passage of air through the valve stem and past the seat and valve when the latter is open. This cooperates with the construction of the screw plug 12 and its open side arch formation to insure high inflation speed for the valve construction as a whole.

Instead of forming the cup element as an integral part of the center pin, I may use the construction shown in Figure 4 where the center pin is provided with an annular shoulder or enlargement 29 upon which rests the reduced end 27 of the cup element 28. This cup element is drawn from the sheet metal and forced upon the center pin 8 into engagement with the shoulder or enlargement 29, the center pin 8 being slightly enlarged as indicated at 31 if desired. This shoulder or enlargement 29 not only locates the cup at the proper place on the center pin, but also positively prevents the cup from slipping on the center pin when the valve inside construction is unscrewed from the stem and the barrel gasket tends to stick to its tapered or bevelled seat.

A spring 30 is interposed between the cup 26 (or 28 as the case may be) and the shoe or hood member 11 functions to hold the cup and its gasket or washer against the seat provided by the end of the barrel member 17. Of course sufficient pressure against the head 9 of center pin 8 can overcome the pressure of spring 30 and the air pressure within the pneumatic article so as to permit the escape of air through the valve or additional inflation of the pneumatic article.

It is to be noted that the screw plug 12 is flat and comparatively thin and therefore leaves a considerable amount of unobstructed space within and through the valve stem and permits the inflating air to freely enter the bore of the barrel, resulting in a maximum inflation speed. This screw plug also guides the center pin and holds it centrally within the stem, thus assuring a square fit between the lower end or seat of the barrel and the washer or gasket 22. The screw plug also holds the center pin in position so that it may not slip off the depressing member of the air chuck or other inflating device.

By molding the washer or gasket 22 to the center pin, leakage, due to grooves or other imperfections on the surface of the pin is prevented. A flat, even seating surface for the end of the barrel is assured. The conical projection 23 relatively centers the seat and the washer or the gasket, and insures a tight, accurate and leak proof fit and seat. The extension of the upper surface of the washer or gasket 22 prevents the end 21 of the barrel coming too near the edge of the washer or gasket and any possible leakage from the source. The molding of this gasket or washer also obviates the necessity of the present costly and laborious cutting of washers and gaskets from sheet rubber and assembling these articles to or on the center pin. The construction also eliminates the assembly of the screw plug to the barrel and provides means whereby the barrel is positively and accurately forced into its proper position. These various advantages all show the simplicity in manufacturing and assembling this construction.

What I claim is:

1. A screw plug for mounting a valve "insides" within a valve stem and positioning and guiding the center pin thereof, comprising a narrow segmental body having threaded ends adapted to fit the internal threads of a valve stem and having a bore to slidably receive the center pin of the valve insides, and having depending legs at its ends adapted to bear against the upper end of the barrel of the valve insides and force and hold it in its proper position within said valve stem, said legs forming the ends of an open sided arch whose top is the segmental body.

2. A pneumatic valve, including in combination a valve stem having a bore therethrough and provided with an internal bevelled or tapered shoulder, a valve insides assembly construction including an elongated center pin having a gasket or washer secured thereto to form a valve, a screw plug comprising a narrow segmental body adapted to be inserted and secured within the upper end of the bore in the valve stem, said screw plug having a bore to slidably receive and guide the center pin, a sleeve-like barrel member having a bevelled or tapered gasket adapted to fit said bevelled or tapered seat in said valve stem and having its lower end formed to provide a seat adapted to be engaged by said washer or gasket on said center pin, said screw plug being provided with legs to engage the upper end of the barrel to force its bevelled or tapered gasket into fluid tight engagement with the bevelled or tapered seat in the valve stem, said legs forming the ends of an open sided arch whose top is the segmental body and resilient means for normally holding the washer or gasket on the center pin against the seat provided by the lower end of the barrel.

3. A pneumatic valve, including in combination a valve stem having a bore therethrough provided with an internal seat, and having internal screwthreads above said seat; a valve insides including a sleeve-like barrel member having an external zone receivable against said seat in the valve stem and having its lower end formed to provide a circular valve seat well spaced concentrically from the inside of the valve stem, a center pin, a screw-plug comprising a narrow segmental body having externally threaded ends adapted to engage the screw-threads of the valve stem above its internal seat and having a bore slidably receiving the center pin, and having depending legs at its ends adapted to bear upon the upper end of the barrel member to force it into its aforesaid seated position in the valve stem, said legs forming the ends of an open-sided arch whose top is the segmental body, and a valve on said center pin for cooperation with the aforesaid circular seat of the barrel member, said valve comprising a cup member on said pin well spaced concentrically from the inside of the valve stem, and valve washer or gasket material in said cup molded to said pin and cup, and extending over the edge of the cup to provide an annular area of said material for engagement with the circular valve seat.

4. A valve insides comprising a cylindrical barrel having a longitudinal bore therethrough, a valve pin extending through said bore and having a valve proper secured to the pin, said valve cooperating with a seat upon the barrel, and a bar of greater depth than width freely rotatable on the pin and rotatable with respect to the barrel, said bar having two ends threaded and serving as the means by which the valve insides may be screwed into and retained in a valve stem.

5. A valve insides comprising a cylindrical barrel having a longitudinal bore therethrough, a valve pin extending through said bore and having a valve proper secured to the pin, said valve cooperating with the seat upon the barrel, a solid bar of greater depth than width freely rotatable upon the pin and detached from and rotatable with respect to the barrel and adapted to engage said barrel, the two ends of said bar being threaded whereby the bar may be screwed into a valve stem and push said barrel into proper position in said stem and retain said barrel.

6. A valve insides comprising a cylindrical barrel having a longitudinal bore therethrough and provided at one end with a valve seat, a valve pin extending through said bore and having a valve proper secured thereto, spring means for maintaining said valve proper normally seated on said valve seat, and a bar of greater depth than width freely rotatable on the pin and rotatable with respect to the barrel, said bar having two ends threaded and serving as the means by which the valve insides may be screwed into and retained in a valve stem.

7. In a valve insides of the type having a cylindrical barrel provided with a longitudinal bore therethrough and a valve seat at one end thereof together with a valve pin extending through said bore and having a valve proper secured thereto adapted to seat on said valve seat, a bar having portions adapted to engage the end of the barrel opposite to the valve seat and being provided with an opening through which said valve pin freely extends wherefore said bar is freely rotatable on said pin, said bar having a transverse width relatively small with respect to the diameter of said bore and a depth greater than said width and having its opposite ends threaded whereby said bar serves as the means by which the valve insides may be screwed into and retained in a valve stem.

8. In a valve insides of the type having a cylindrical barrel provided with a longitudinal bore therethrough and a valve seat at one end thereof together with a valve pin extending through said bore and having a valve proper secured thereto and means for maintaining said valve proper normally seated on said valve seat, a bar having portions adapted to engage the end of the barrel opposite to the valve seat and being provided with an opening through which said valve pin freely extends wherefore said bar is freely rotatable on said pin, said bar having a transverse width relatively small with respect to the diameter of said bore and a depth greater than said width and having its opposite ends threaded whereby said bar serves as the means by which the valve insides may be screwed into and retained in a valve stem.

LEWIS C. BROECKER.